US008032585B2

(12) United States Patent  
Cherkasova et al.

(10) Patent No.: US 8,032,585 B2
(45) Date of Patent: Oct. 4, 2011

(54) REGRESSION-BASED SYSTEM AND METHOD FOR DETERMINING RESOURCE COSTS FOR COMPOSITE TRANSACTIONS

(75) Inventors: Ludmila Cherkasova, Fort Collins, CO (US); Qi Zhang, Fort Collins, CO (US); Guy Mathews, Fort Collins, CO (US); Wayne Greene, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 820 days.

(21) Appl. No.: 11/684,563

(22) Filed: Mar. 9, 2007

(65) Prior Publication Data

US 2008/0222197 A1 Sep. 11, 2008

(51) Int. Cl.
*G06F 15/16* (2006.01)
(52) U.S. Cl. ........................................ 709/203
(58) Field of Classification Search ............ 709/203
See application file for complete search history.

(56) References Cited

U.S. PATENT DOCUMENTS

| 5,283,897 | A   | * | 2/1994  | Georgiadis et al. ......... 718/105 |
| 7,415,453 | B2  | * | 8/2008  | Suzuki et al. ................... 1/1 |
| 7,757,214 | B1  | * | 7/2010  | Palczak et al. .............. 717/121 |
| 2002/0099521 | A1 | * | 7/2002 | Yang et al. .................. 702/186 |
| 2003/0065702 | A1 | * | 4/2003 | Singh et al. ................. 709/105 |
| 2005/0091640 | A1 | * | 4/2005 | McCollum et al. ......... 717/117 |
| 2008/0281564 | A1 | * | 11/2008 | Suzuki et al. .................. 703/2 |

* cited by examiner

*Primary Examiner* — Jeffrey Pwu
*Assistant Examiner* — Saad A Waqas

(57) ABSTRACT

A method comprises receiving a representative workload of a computing system, where the representative workload comprises at least one composite transaction. In certain embodiments, the representative workload is a historical workload of a computing system. In general, a composite transaction refers to a transaction that comprises a plurality of transactions. For instance, a given transaction for serving a client's request for information (e.g., a web page) may include embedded therein a plurality of requests/responses for objects (e.g., images, etc.) that form the information (e.g., that form the requested web page). The method further comprises determining, based at least in part on a statistical regression-based analysis, a resource cost for the at least one composite transaction, where the resource cost reflects an amount of utilization of at least one resource of the computing system, such as CPU utilization, in serving the at least one composite transaction.

17 Claims, 5 Drawing Sheets

REGRESSION-BASED SYSTEM AND METHOD FOR DETERMINING RESOURCE COSTS FOR COMPOSITE TRANSACTIONS

CROSS-REFERENCE TO RELATED APPLICATIONS

This application is related to concurrently filed and commonly assigned U.S. patent application Ser. No. 11/684,567 entitled "SYSTEM AND METHOD FOR DETERMINING A SUBSET OF TRANSACTIONS OF A COMPUTING SYSTEM FOR USE IN DETERMINING RESOURCE COSTS", and concurrently filed and commonly assigned U.S. patent application Ser. No. 11/684,569 entitled "SYSTEM AND METHOD FOR CAPACITY PLANNING FOR COMPUTING SYSTEMS", the disclosures of which are hereby incorporated herein by reference.

TECHNICAL FIELD

The following description relates generally to capacity planning for computer systems, and more particularly to systems and methods for determining resource costs for composite transactions included an a representative workload.

DESCRIPTION OF RELATED ART

Today, computer systems are delivering (e.g., via computer networks, such as the Internet) a large array of business, government, and personal services. Similarly, mission critical operations, related to scientific instrumentation, military operations, and health services, are making increasing use of computer systems and computer networks for delivering information and distributed coordination. For example, many users are accessing service providers' computer systems via the Internet seeking such services as personal shopping, airline reservations, rental car reservations, hotel reservations, on-line auctions, on-line banking, stock market trading, as well as many other services being offered by service providers via computer networks, such as the Internet. Therefore, many service providers are competing in such electronic forum. Accordingly, it is important for such service providers (sometimes referred to as "content providers") to provide high-quality services. To do so, it has become desirable for such service providers to perform appropriate capacity planning to ensure that they can adequately service the demands placed on their systems by their clients in a desired manner (e.g., provide responses to requests in sufficiently fast time, etc., such as by serving responsive web pages to a requesting client within 8 seconds and/or satisfy some other quality of service target).

As information technology ("IT") and application infrastructures, such as those employed by the above-mentioned service providers for serving their clients, have become more complex, predicting and controlling the issues surrounding system performance and capacity planning have become a difficult (and sometimes overwhelming) task to many organizations. For larger IT projects, it is not uncommon for the cost factors related to performance tuning, performance management, and capacity planning to result in the largest and least controlled expense. Application performance issues have an immediate impact on customer satisfaction. A sudden slowdown of an enterprise-wide application can affect a large population of customers, can lead to delayed projects, and ultimately can result in company financial loss.

Large-scale enterprise development projects are increasingly relying on Service-Oriented Architecture (SOA) design. This approach provides a collection of mechanisms and interfaces for a dynamic enterprise IT environment to connect applications where the classic, data-processing legacy systems can be integrated with agile web-based front-end applications. Application servers have emerged to provide a standardized platform for developing and deploying scalable enterprise systems. The application servers are often considered a core component of an enterprise system and an integral part of a new trend toward building SOAs.

Multi-tier architectures are also commonly being employed. For instance, the three-tier architecture paradigm has become an industry standard for building scalable client-server applications. In a typical three-tier architecture for an application, the application comprises the following three tiers: 1) an interface tier (sometimes referred to as the presentation tier), 2) an application tier (sometimes referred to as the logic or business logic tier), and 3) a data tier (e.g., database tier). The first tier provides a user interface, such as a graphical user interface (GUI), with which the user may interact with the other tiers. The second tier provides functional process logic, which may comprise one or more separate modules running on a workstation or application server, for example. The application tier may, in some implementations, be multi-tiered itself (in which case the overall architecture may be called an "n-tier architecture"). The third tier manages the storage and access of data for the application. Typically, a relational database management system (RDBMS) on a database server or mainframe contains the data storage logic of the third tier. The three tiers are developed and maintained as independent modules, often on separate platforms. Quite often the first and second tiers may be implemented on common hardware (i.e., on a common platform), while the third tier is implemented on a separate platform, but any arrangement of the three tiers (i.e., either on common hardware or across separate hardware) may be employed in a given implementation. The three-tier architecture is generally intended to allow any of the three tiers to be upgraded or replaced independently as requirements, desires, and/or technology change. For example, a change of operating system from Microsoft Windows™ to Unix™ may only affect the user interface code.

As an example, suppose that a service provider develops a web application that provides banking services to clients via the web. In this example, the banking application may comprise a user interface tier that defines the user interface with which the clients interact to perform desired banking transactions. The banking application may further comprise an application tier that defines the business logic and functionality of the banking application. The banking application may further comprise a data tier that is operable to manage access of the clients' respective account balance data, for example. In such multi-tiered systems, frequent calls to application servers and data storage (e.g., databases) may place a heavy load on these resources and may cause throughput bottlenecks and high server-wide processing latency.

Traditionally, preliminary system capacity estimates are performed for service provider systems by using synthetic work-load or benchmarks which are created to reflect a "typical application behavior" for "typical client requests". While this performance evaluation approach can be useful at the initial stages of design and development of a future system, it is often inadequate for answering more specific questions about an existing system that is deployed in a service provider's environment. In many cases, the workload actually encountered by a deployed system does not correspond with the synthetic workload that was expected for the system, and thus the preliminary system capacity estimates may be inadequate. Further, the techniques used for arriving at the preliminary system capacity estimates are unable to answer specific capacity planning questions that a given service provider may have about the capacity of the deployed system. Further still, evaluating the capacity of a deployed system based on a representative workload of the deployed system, such as an actual historical workload encountered by the deployed system, may be difficult and/or compute-intensive, particularly when the representative workload includes composite transactions. In general, a composite transaction refers to a transaction that comprises a plurality of transactions. For instance, a given transaction for serving a client's request for information (e.g., a web page) may include embedded therein a plurality of requests/responses for objects (e.g., images, etc.) that form the information (e.g., that form the requested web page), and thus the given transaction for serving the information may be considered a composite transaction as it involves various transactions for serving the objects that form such information. Determining a resource cost associated with serving such composite transactions may be desired for evaluating capacity of a computing system, but techniques for so determining such resource costs, particularly in a manner that is not compute prohibitive, are lacking in traditional capacity planning systems.

DETAILED DESCRIPTION

Figure 1:
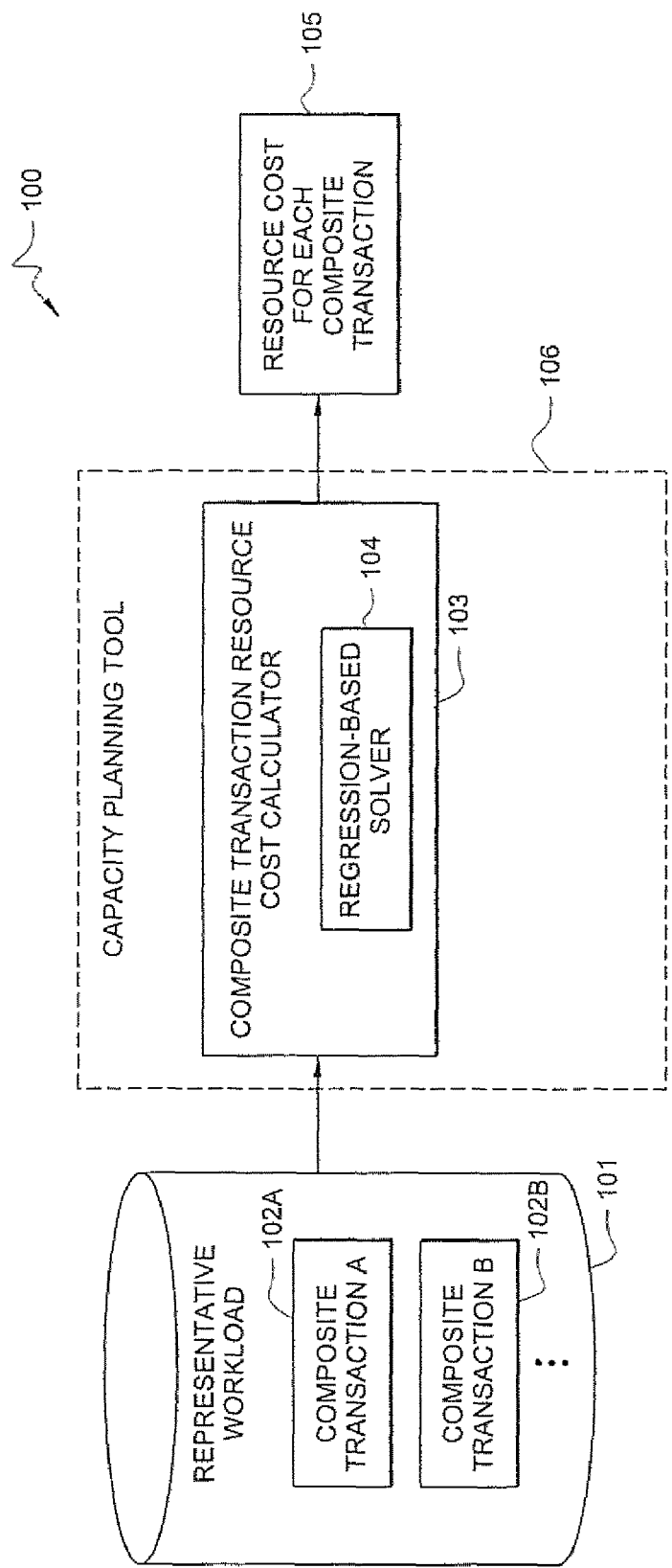
FIG. 1 shows an exemplary system according to an embodiment of the present invention.

Various embodiments of the present invention are now described with reference to the above figures, wherein like reference numerals represent like parts throughout the several views. As described further below, the present invention provides a regression-based system and method for determining resource costs associated with serving composite transactions. As described further below, such resource costs reflect an amount of utilization of at least one resource (e.g., CPU utilization) for serving a corresponding composite transaction.

As described further below, in certain embodiments, a representative workload of a system under analysis (e.g., a service provider's deployed system) is received, which contains at least one composite transaction. The representative workload may, in some embodiments, be data representing an actual historical workload encountered by the system under analysis. Thus, embodiments of the present invention may be employed to analyze a "lived" workload of a deployed system, which may enable more accurate analysis and planning for the system beyond the traditional preliminary system capacity estimates mentioned above. In certain embodiments, the resource costs may be determined for different tiers of a multi-tier architecture. Thus, exemplary embodiments are disclosed that enable a resource cost (e.g., CPU cost) of different client transactions at different tiers to be determined (e.g., approximated). Further, in certain embodiments, the determined resource costs may be further analyzed for performing planning, such as for answering capacity planning questions about the computing system under analysis. Thus, in certain embodiments, the determined cost functions may be used for evaluating the resource requirement of a scaled or modified transaction workload mix in order to accurately size the future system, for example.

FIG. 1 shows an exemplary system 100 according to an embodiment of the present invention. As shown in this example, a representative workload 101 comprises one or more composite transactions, such as composite transactions 102A-102B (referred to collectively herein as composite transactions 102). In general, a composite transaction refers to a transaction that comprises a plurality of transactions. For instance, a given transaction for serving a client's request for information (e.g., a web page) may include embedded therein a plurality of requests/responses for objects (e.g., images, etc.) that form the information (e.g., that form the requested web page), and thus the given transaction for serving the information may be considered a composite transaction as it involves various transactions for serving the objects that form such information. A more detailed example of a composite transaction is described further below with reference to FIG. 2.

In the exemplary embodiment of FIG. 1 representative workload 101 may be an actual historical workload collected for a service provider (referred to herein as a "live workload"), for example. That is, representative workload 101 may comprise data representing an actual historical workload collected for a system under analysis over a given period of time, say a preceding 3-month period for example. Representative workload 101 may comprise data stored to a computer-readable medium, such as memory, hard drive, peripheral data storage drive, optical data storage (e.g., CD, DVD, etc.), magnetic data storage, tape storage, etc. Representative workload 101 may be stored in the form of any suitable data structure, such as to a database, file, table, etc. Again, in certain embodiments, such data may represent an actual historical workload of the service provider's computing system.

The representative workload data 101 may be collected through well-known application logs and system usage metrics, such as CPU utilization measured at a defined time scale (e.g., 5 minutes or so). As one example, the data collected in access logs generated by Hewlett-Packard's Open View Service Desk (OVSD) application server may be used in forming representative workload 101. Other types of access logs, which may be customized for their respective applications, may be used in accordance with embodiments of the present invention. As an illustrative example, such access logs typically collect such data as the following for each transaction: date and a time stamp of the request, session ID, transaction URL, and referrer field. According to one embodiment of the present invention, the timestamp, session ID, and transaction URL fields of the access log are used for the analysis.

System 100 further comprises a composite transaction resource cost calculator ("CTRCC") 103, which receives representative workload 101. Such CTRCC 103 is operable to analyze the received representative workload 101 and determine a corresponding resource "cost" 105 for each of the composite transactions 102. In general, the resource cost of a composite transaction reflects an amount of utilization of at least one resource in serving the composite transaction. For example, the resource cost that is computed in certain embodiments is a CPU cost, which is reflective of an amount of CPU utilization attributable to serving the corresponding composite transaction. In certain embodiments, such CPU utilization may be a corresponding amount of CPU utilization of a given tier of multi-tier architecture that is attributable to serving the corresponding composite transaction. In certain embodiments, CTRCC 103 may periodically receive a representative workload 101 for a service provider and provide an analysis of resource costs 105 for the transactions included in such workload 101. For instance, workload 101 may, in some embodiments, be a historical workload encountered by the service provider's system (e.g., over the preceding 3-month period), and CTRCC 103 may therefore provide an updated analysis over time as the number of clients supported by the service provider and/or the client activities may change over time.

As described further herein, in certain embodiments, CTRCC 103 employs a regression-based solver 104 for determining the resource cost 105 for the composite transactions 102. An exemplary statistical regression-based analysis that may be employed by such regression-based solver 104 is described further below in connection with FIG. 4. In certain embodiments, the representative workload 101 may comprise certain transactions that are not composite transactions, and CTRCC 103 may also be operable to determine a resource cost for such non-composite transactions.

CTRCC 103 and/or regression-based solver 104 may be implemented as computer-executable software code stored to a computer-readable medium and/or as hardware logic, as examples. Once determined, resource cost 105 may be stored to a computer-readable medium, such as memory, hard drive, peripheral data storage drive, optical data storage (e.g., CD, DVD, etc.), magnetic data storage, tape storage, etc. The resource cost 105 may be stored in the form of any suitable data structure, such as to a database, file, table, etc.

In certain embodiments, CTRCC 103 is implemented as part of a capacity planning tool 106. In certain embodiments, such a capacity planning tool 106 may be operable to further analyze computed resource costs 105 to provide capacity planning analysis for the system under analysis, such as by answering certain capacity planning questions that the service provider may have, such as discussed further below in connection with FIG. 5. Such capacity planning tool 106 may be implemented as computer-executable software code stored to a computer-readable medium and/or as hardware logic, as examples.

Figure 2:
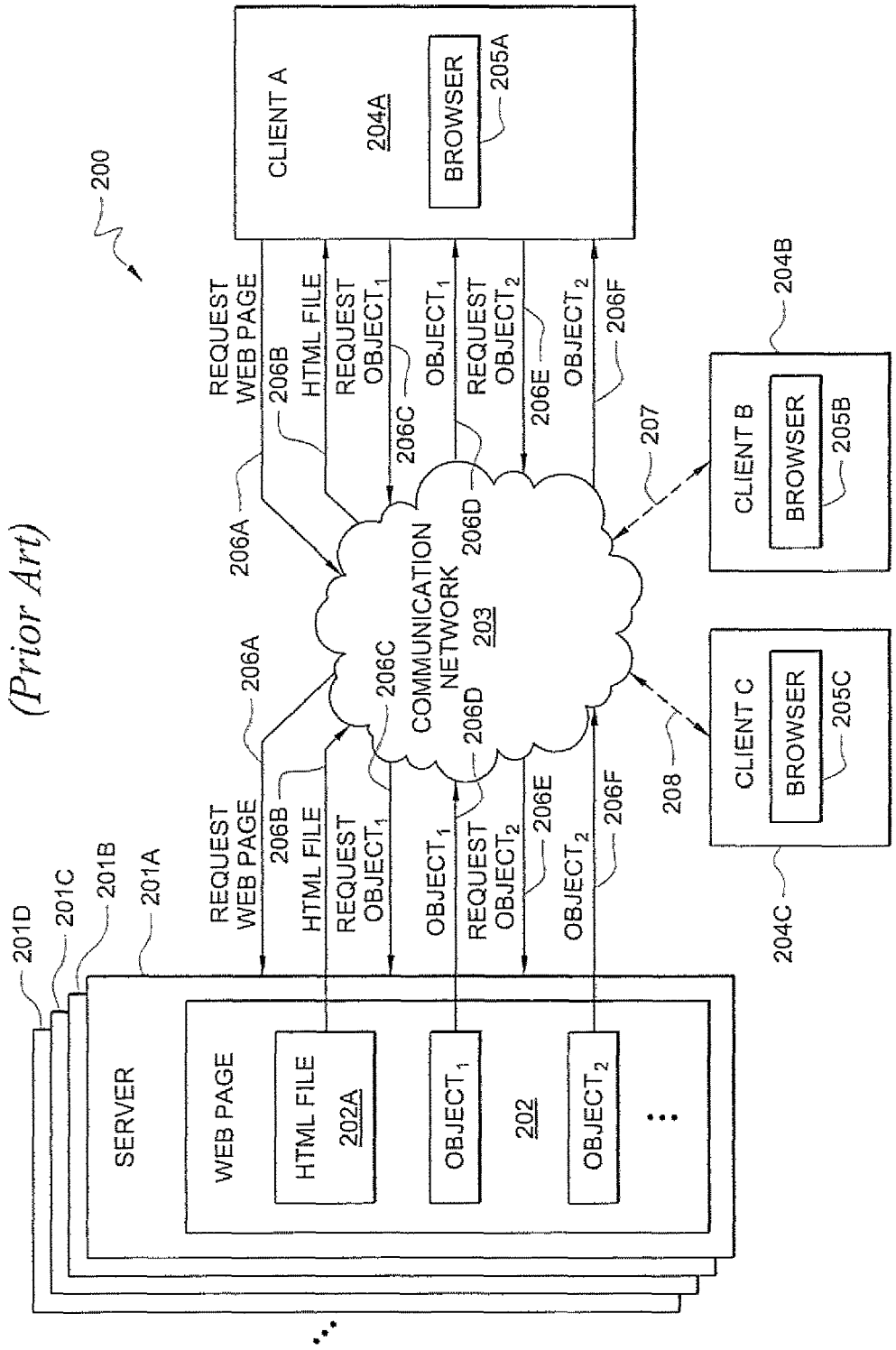
FIG. 2 shows an exemplary client-server system for which embodiments of the present invention may be implemented to analyze.

Turning to FIG. 2, an exemplary client-server system 200 is shown in which certain embodiments of the present invention may be implemented. As shown, one or more servers 201A-201D may provide services (information) to one or more clients, such as clients A-C (labeled 204A-204C, respectively), via communication network 203. Communication network 203 is preferably a packet-switched network, and in various implementations may comprise, as examples, the Internet or other Wide Area Network (WAN), an Intranet, Local Area Network (LAN), wireless network, Public (or private) Switched Telephony Network (PSTN), a combination of the above, or any other communications network now known or later developed within the networking arts that permits two or more computers to communicate with each other.

In a preferred embodiment, servers 201A-201D comprise web servers that are utilized to serve up web pages to clients A-C via communication network 203 in a manner as is well known in the art. Accordingly, system 200 of FIG. 2 illustrates an example of servers 201A-201D serving, up web pages, such as web page 202, to requesting clients A-C. Of course, embodiments of the present invention are not limited in application to determining resource costs for serving web pages, but may likewise be implemented for determining resource costs for other types of composite transactions. Thus, while various examples are provided herein for determining resource costs for client accesses of web pages, it should be understood that such examples are intended to render the disclosure enabling for determining resource costs associated with various other types of composite transactions.

In the example of FIG. 2, web page 202 comprises an HTML (or other mark-up language) file 202A (which may be referred to herein as a "main page"), and several embedded objects (e.g., images, etc.), such as $Object_1$ and $Object_2$. Techniques for serving up such web page 202 to requesting clients A-C are well known in the art, and therefore such techniques are only briefly described herein. In general, a browser, such as browsers 205A-205C, may be executing at a client computer, such as clients A-C. To retrieve a desired web page 202, the browser issues a series of HTTP requests for all objects of the desired web page. For instance, various client requests and server responses are communicated between client A and server 201A in serving web page 202 to client A, such as requests/responses 206A-206F (referred to collectively herein as requests/responses 206). Requests/responses 206 provide a simplified example of the type of interaction typically involved in serving a desired web page 202 from server 201A to client A. As those of skill in the art will appreciate, requests/responses 206 do not illustrate all interaction that is involved trough TCP/IP communication for serving a web page to a client, but rather provides an illustrative example of the general interaction between client A and server 201A in providing web page 202 to client A.

When a client clicks a hypertext link (or otherwise requests a URL) to retrieve a particular web page, the browser first establishes a TCP connection with the web server by sending a SYN packet (not shown in FIG. 2). If the server is ready to process the request, it accepts the connection by sending back a second SYN packet (not shown in FIG. 2) acknowledging the client's SYN. At this point, the client is ready to send HTTP requests 206 to retrieve the HTML file 202A and all embedded objects (e.g., $Object_1$ and $Object_2$), as described below.

First, client A makes an HTTP request 206A to server 201A for web page 202 (e.g., via client A's browser 205A). Such request may be in response to a user inputting the URL for web page 202 or in response to a user clicking on a hyperlink to web page 202, as examples. Server 201A receives the HTTP request 206A and sends HTML file 202A (e.g., file "index.html") of web page 202 to client A via response 206B. HTML file 202A typically identifies the various objects embedded in web page 202, such as $Object_1$ and $Object_2$. Accordingly, upon receiving HTML file 202A, browser 205A requests the identified objects, $Object_1$ and $Object_2$, via requests 206C and 206E. Upon server 201A receiving the requests for such objects, it communicates each object individually to client A via responses 206D and 206F, respectively. As illustrated by the generic example of FIG. 2, each object of a requested web page is retrieved from a server by an individual HTTP request made by the client. Thus, a given client access of web page 202 may comprise a plurality of request/response pairs (or "transactions"), and thus such an access of web page 202 may be referred to herein as a "composite transaction." For instance an access of web page 202 is a composite of the request/response pairs for accessing the various objects that make up the web page 202.

Again, the above interactions are simplified to illustrate the general nature of requesting a web page, from which it should be recognized that each object of a web page is requested individually by the requesting client and is, in turn, communicated individually from the server to the requesting client. The above requests/responses 206 may each comprise multiple packets of data. Further, the HTTP requests can, in certain implementations, be sent from a client through one persistent TCP connection with server 201A, or, in other implementations, the requests may be sent through multiple concurrent connections. Server 201A may also be accessed by other clients, such as clients B and C of FIG. 2, and various web page objects may be communicated in a similar manner to those clients through packet communication 207 and 208, respectively.

In many instances, a service provider deploys a web service as a multi-tier client-server application. In such instances, a client typically communicates with the web service via a web interface tier, where the unit of activity at the client-side corresponds to a download of a web page generated by the application. As mentioned above a web page is generally composed of an HTML file and several embedded objects such as images. A browser retrieves a web page by issuing a series of HTTP requests for all objects: first it retrieves the main HTML file and then after parsing it, the browser retrieves the embedded images. It is very common that a web server and application server reside on the same hardware, and shared resources are used by the application and web servers to generate web pages as well as to retrieve page-embedded objects. In the access logs from Hewlett-Packard's Open View Service Desk (OVSD) application server, for example, there are both types of entries: web page requests and consequent entries for embedded images.

According to one embodiment, the client web page requests, also called web page views, are of interest in determining resource costs 105. Thus, in one embodiment, a web page accessed by the client and generated by the application is considered as a composite transaction, as such web page access includes the various transactions for serving the embedded objects that form such web page.

According to certain embodiments, a service provider collects the server access logs, reflecting processed client requests and client activities at the site. Again, any suitable usage logging applications now known (such as Hewlett-Packard's Open View Service Desk) or later developed, may be used for monitoring the service provider's system and collecting the access logs. According to one embodiment, in the CTRCC 103's analysis, it considers a reduced trace that contains only composite transactions (web page views) as discussed above. All the embedded images, style sheets, and other format-related primitives contained in any composite transactions are omitted, as effectively being absorbed into their respective composite transaction. Moreover, in certain embodiments, the CTRCC 103 further distinguishes a set of unique transaction types and a set of client accesses to them. For static web pages, for example, the URL uniquely defines a file accessed by clients. For dynamic pages, the requests from different users to the same web page URL may appear as requests to different URLs due to the client-specific extension or a corresponding parameter list. Thus, in certain embodiments, the CTRCC 103 carefully filters out these client-specific extensions in the reduced trace.

In certain embodiments, the above-mentioned filtering of transactions to result in a representative workload that contains composite transactions (eliminating the individual web requests for objects that form a composite transaction) and containing an identification of a corresponding transaction type of each composite transaction, is performed (e.g., by filtering logic) as part of processing access logs for preparing representative workload 101 to be received by CTRCC 103. In this manner, such filtering logic processes the access logs to form the representative workload 101 in a form that is convenient for transaction analysis and further processing performed by the CTRCC 103 as described herein. Thus, the representative workload 101 shown in FIG. 1 as being received by CTRCC 103 may, in certain embodiments, comprise data that has been previously filtered and organized by filtering logic. In other embodiments, such filtering logic may be included as part of CTRCC 103, wherein CTRCC 103 may receive raw data from access logs and perform the above-mentioned filtering and then the processing for determining the resource costs 105 as described further herein.

Figure 3:
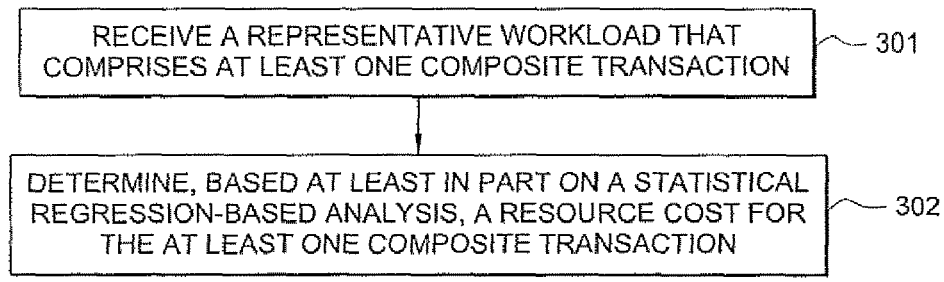
FIG. 3 shows an exemplary operational flow according to an embodiment of the present invention.

FIG. 3 shows an exemplary operational flow according to one embodiment of the present invention. In operational block 301, CTRCC 103 receives a representative workload 101 that comprises at least one composite transaction (e.g., composite transactions 102A-102B of FIG. 1). As mentioned above, the representative workload 101 may comprise data that represents a representative workload of a computing system under analysis (e.g., represents an actual historical workload of the computing system), and such data may be input in any suitable way to CTRCC 103. For instance, CTRCC 103 may read the data from a data structure (e.g., file, database, table, etc.) that is stored to a computer-readable medium, or the data may otherwise be received by CTRCC 103.

In block 302, CTRCC 103 determines, based at least in part on a statistical regression-based analysis (e.g., of regression-based solver 104), a resource cost 105 for the at least one composite transaction. For instance, as described further herein, a statistical regression-based analysis may be employed by regression-based solver 104 to determine (e.g., estimate) a corresponding resource cost 105 for each composite transaction included in a received workload 101.

Figure 4:
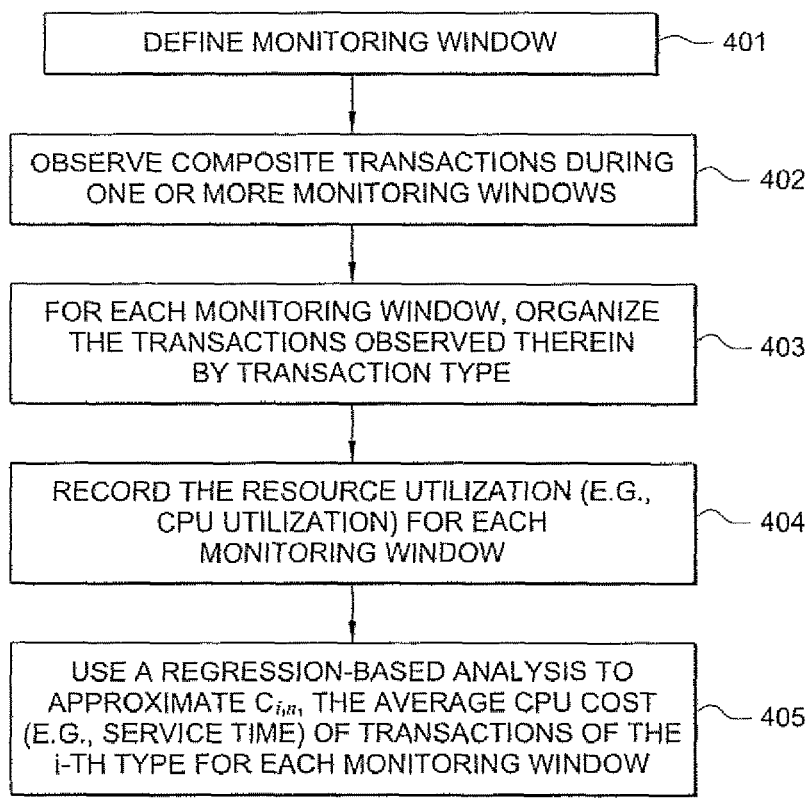
FIG. 4 shows an operational flow of an exemplary statistical regression-based analysis according to one embodiment of the present invention.

An exemplary statistical regression-based analysis that is employed by regression-based solver 104 according to one embodiment of the present invention is now described with reference to FIG. 4. This exemplary regression-based analysis is described for computing CPU costs of a server for serving web pages, and thus according to this exemplary embodiment, a client web page request is considered as the main, basic unit of client/server activity. However, the exemplary regression-based analysis may likewise be employed for computing CPU (and/or other resource) costs associated with serving other types of composite transactions, and thus is not limited in application to analysis of web page accesses.

As mentioned above, often an application server is also responsible for serving the embedded objects of a page (e.g., embedded images, etc.). Thus, it may be desirable for the capacity planning tool 106 to evaluate the overall CPU resources consumed by the application server for corresponding transaction processing, e.g., for generating the requested web page and also retrieving and serving all the embedded objects in the above example. In other words, it may be desirable to evaluate the overall CPU resources utilized by a given tier of a multi-tier architecture (e.g., by the application server of a three-tier architecture) in serving a composite transaction.

There are no common tools for effectively measuring the service times for all these objects, while the accurate CPU consumption estimates are required for capacity planning of the systems operating under real workload mix. While one may build such a tool by explicitly instrumenting the application with additional measurements, this would be an application-dependent and obtrusive solution that might lead to significant overhead, and is thus not used in practice. On the other hand, it should be recognized that embodiments of the present invention described herein are not application dependent and do not require modification of the applications for inclusion of additional logic for explicit instrumentation (and thus do not lead to significant overhead in the operation of the applications for determining resource costs).

According to certain embodiments of the present invention, the exemplary method for determining resource costs of composite transactions, which is based on a statistical regression technique, provides an efficient and simple way to accurately approximate the CPU cost (e.g., overall CPU service time) of different composite transactions. This exemplary method has a unique ability to "absorb" some level of uncertainty or noise present in real-world data. Thus, it can be effectively employed for evaluating an actual historical workload of a computing system that is under analysis. As described below, combining the knowledge of critical workload features of a system under analysis with a statistical regression technique provides an elegant and powerful solution for performance evaluation of complex systems with real workloads.

According to this exemplary embodiment, a number of different transactions are observed over fixed-length time intervals, denoted as monitoring windows, in order to capture the changes in user behaviors. Thus, a monitoring window is defined in operational block 401 of FIG. 1, and a number of different composite transactions are observed in one or more of such monitoring windows in operational block 402. The time length of the monitoring window should preferably be selected intelligently. The monitoring window should not be too small (in order to avoid the representative workload contained therein from being too noisy), and the monitoring window should not be too big (in order to avoid overlooking the variance of user activities). In the experiments described herein, we consider 1 hour as a reasonable window length, but the monitoring window length may be determined to be set to some other time period based on the above-mentioned factors.

The transaction mix and system utilization are recorded at the end of each monitoring window, such as shown in the example of Table 1 below. Thus, for each monitoring window, the transactions observed therein are organized by transaction type in block 403, and the resource utilization (e.g., CPU utilization) is recorded for each monitoring window in operational block 404. In general, the different transaction types, refer to different activities/functionalities of the application and/or different web pages related to the site and processed by the service provider's hardware under study. The different transaction types are typically present in the application logs. As an example, one type of transaction for a banking application may be a transaction in which a client views his account balance, while a client transferring funds between accounts might be a second transaction type of the banking application.

TABLE 1

An example of transaction profile in machine 1

| Time (hour) | $N_1$ | $N_2$ | $N_3$ | $N_4$ | ... | $N_{756}$ | $U_{CPU}$(%) |
|---|---|---|---|---|---|---|---|
| 1 | 21 | 15 | 21 | 16 | ... | 0 | 13.3201 |
| 2 | 24 | 6 | 8 | 5 | ... | 0 | 8.4306 |
| 3 | 18 | 2 | 5 | 4 | ... | 0 | 7.4107 |
| 4 | 22 | 2 | 4 | 7 | ... | 0 | 6.4274 |

TABLE 1-continued

An example of transaction profile in machine 1

| Time (hour) | $N_1$ | $N_2$ | $N_3$ | $N_4$ | ... | $N_{756}$ | $U_{CPU}$(%) |
|---|---|---|---|---|---|---|---|
| 5 | 38 | 5 | 6 | 7 | ... | 0 | 7.5458 |
| ... | | | | | | | |

In the example of Table 1, 5 monitoring windows are shown that are each 1 hour in length. In each monitoring window, the number of transactions of a given type are recorded, wherein one or more of the transaction types may be composite transactions. For instance, in the example of Table 1, there are 756 different types of transactions, and the number of occurrences of each transaction type within each monitoring window is recorded. Also, the CPU utilization of each monitoring window is recorded. For instance, the CPU of the system under analysis was utilized 13.3201% of the 1-hour period of time of the first monitoring window shown in Table 1.

As an exemplary application of this representative embodiment, let us assume that there are a total of M transaction types processed by the server (or other computing system) under analysis. Let us use the following denotations.

T is the length of the monitoring window;

$N_i$ is the number of transactions of the i-th type, where $1 \leq i \leq M$;

$U_{CPU,n}$ is the average CPU utilization during this monitoring window at the n-th tier of an application;

$D_{i,n}$ is the average service time of transactions of the i-th type at the n-th tier, where $1 \leq i \leq M$; and $D_{0,n}$ is the average CPU overhead related to "keeping the system up" activities at the n-th tier. For example, there are generally some OS processes and/or background jobs that consume CPU time even when there is no transaction to be serviced in the system. Thus, $D_0$ can be defined to represent such overhead that is typically present in the system under analysis.

From the utilization law, Equation (1) below can be obtained for each of the monitoring windows:

$$D_{0,n} + \sum_i N_i \cdot D_{i,n} = U_{CPU,n} \cdot T. \tag{1}$$

It is practically infeasible to get accurate service times $D_{i,n}$ because this is an overconstrained problem. That is, the exact solution (accurate service times) is feasible for M number of equations with M unknowns (variables). In the above analysis, on the other hand, there are N number of equations where N>K, and is thus an overconstrained problem, wherein it becomes desirable to find an approximate solution that leads to a small error. Since it is practically infeasible to get accurate service times $D_{i,n}$, we let $C_{i,n}$ denote the approximated CPU cost of $D_{i,n}$ for $1 \leq i \leq M$. Then an approximated utilization $U'_{CPU,n}$ can be calculated as $$U'_{CPU,n} = \frac{C_{0,n} + \sum_i N_i \cdot C_{i,n}}{T}. \quad \text{("Equation (2)")}$$

A statistical regression-based analysis may be employed to solve for $C_{i,n}$. Thus, in operational block 405 of FIG. 4, a regression-based analysis is used to approximate $C_{i,n}$ to determine the average CPU cost of transactions of the i-th type for each monitoring window. According to certain embodiments, to solve for $C_{i,n}$, one can choose a regression method from a variety of known methods in the literature, such as the regression methods described in "Algorithms" by R. Sedgewick, Addison-Wesley Publishing Company, Second Edition (see e.g. description beginning at page 551 thereof), the disclosure of which is hereby incorporated herein by reference. A typical objective for a regression method is to minimize either the absolute error:

$$\sum_j |U'_{CPU,n} - U_{CPU,n}|_j$$

or the squared error:

$$\sum_j (U'_{CPU,n} - U_{CPU,n})^2_j,$$

where j is the index of the monitoring window over time.

Finding the best fitting method is outside the scope of this disclosure, and is not described in great detail so as not to unnecessarily detract attention away from the invention. Although, as one example, in some of our experiments we use the Non-negative Least Squares Regression (Non-negative LSQ) provided by MATLAB to get $C_{i,n}$. This non-negative LSQ regression is to minimize the error $$e = \sum_j (U'_{CPU,n} - U_{CPU,n})^2_j$$

such that $C_{i,n} \geq 0$.

The exemplary statistical regression-based analysis proposed above works very well for estimating the CPU demands of composite transactions that themselves might represent a collection of smaller objects, whereas direct measurement methods (e.g., explicitly instrumenting the application under analysis with additional measurements) are not practical, as discussed above.

While the above description has concentrated on evaluating the CPU capacity required for support of a given workload, application of the concepts described herein are not limited to determining such CPU costs. Rather, the regression-based analysis methods described herein may likewise be efficiently applied for evaluating other shared system resources that have an "additive" capacity nature. As one example, embodiments of the present invention may be applied for estimating the latency of the different links on the network path when end-to-end measurements are given but the link's delay of the path is unknown. As another example, the above-described embodiments may be employed for evaluating transactions' memory usage estimates.

In certain embodiments, the above-mentioned technique may be optimized for efficiency by determining a set of "core" transactions present in a representative workload for which the above-described regression-based analysis is performed to determine resource costs associated therewith, such as described further in co-pending and commonly assigned U.S. patent application Ser. No. 11/684,567 entitled "SYSTEM AND METHOD FOR DETERMINING A SUBSET OF TRANSACTIONS OF A COMPUTING SYSTEM FOR USE IN DETERMINING RESOURCE COSTS", the disclosure of which is incorporated herein by reference.

Figure 5:
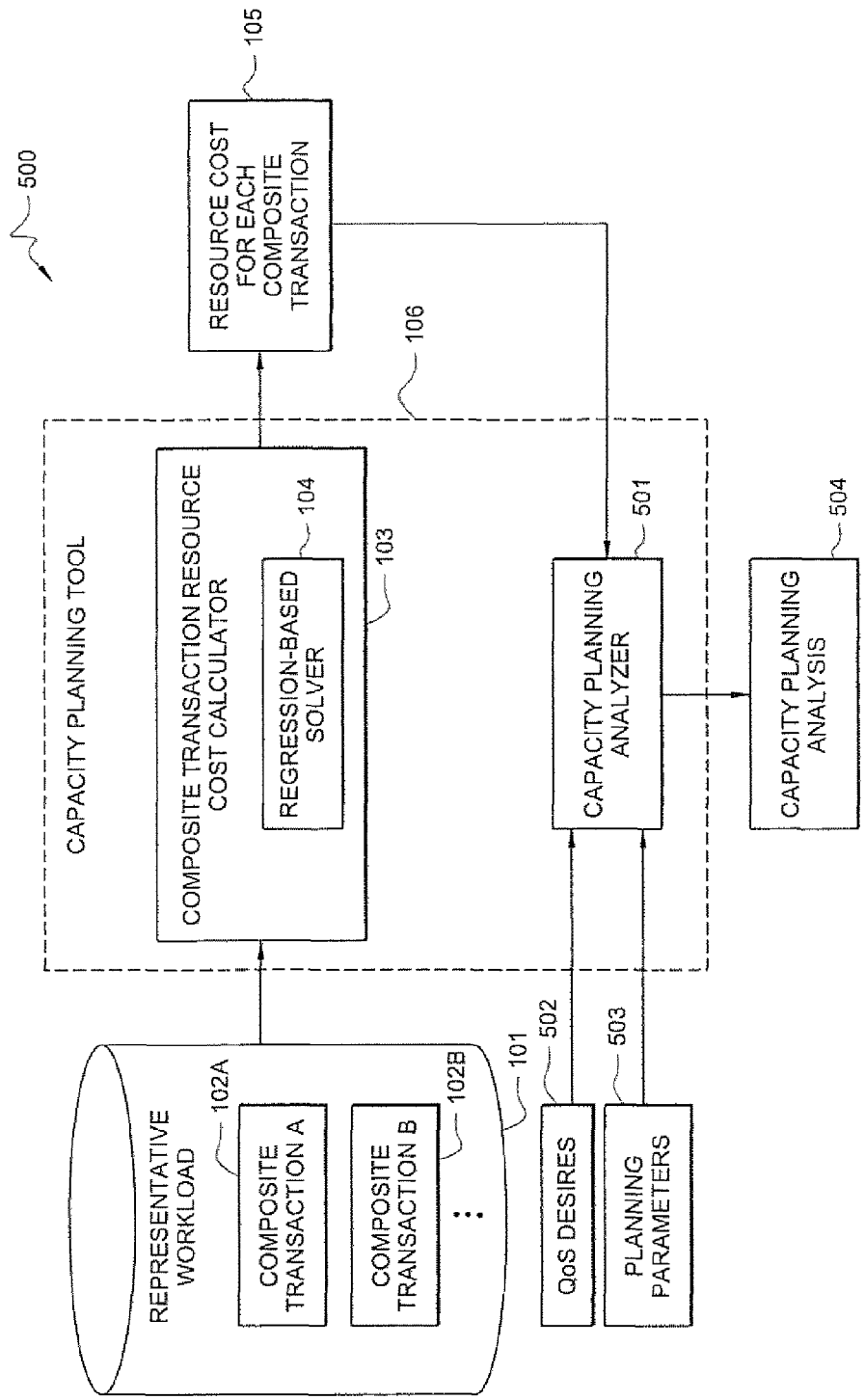
FIG. 5 shows another exemplary system of an embodiment of the present invention, wherein determined resource costs are used for capacity analysis of a computing system.

In certain embodiments, once the resource cost 105 for composite transactions is determined, such resource cost may be used for further analysis, such as for answering capacity planning questions about a system under analysis. For instance, FIG. 5 shows an exemplary system 500 which may be employed for using determined resource costs 105. As with system 100 of FIG. 1, system 500 includes CTRCC 103 having regression-based solver 104 for receiving representative workload 101 and determining resource costs 105 for composite transactions in the manner described above. In this example, capacity planning tool 106 may further comprise capacity planning analyzer 501, which may receive the determined resource costs 105 and further analyze the capacity of the system under analysis. For instance, in certain embodiments, capacity planning analyzer 501 may also receive input (e.g., from a user) indicating QoS desires 502. Such QoS desires 502 may specify, for example, a target QoS that is desired to be provided by the service provider, such as serving web pages to clients with response times no longer than 8 seconds. Capacity planning analyzer 501 may also receive certain planning parameters 503, which may specify a desired modification to the workload of the service provider. For instance, planning parameter 503 may specify an additional number of clients desired to be supported by the service provider. In this manner, the capacity planning analyzer 501 may analyze the received resource costs 105 determined for the representative workload 101 to answer such capacity planning questions that a service provider may have as:

how many additional clients can be supported by the existing system i) while still providing the same performance guarantees (QoS desires 502), e.g., response time under 8 seconds, and ii) assuming that new clients perform similar activities as already existing clients in the system, i.e., the system processes the same type of workload?

does the existing system have enough available capacity for processing an additional service for N number of clients (defined by planning parameters 503) where the client activities and behaviors are specified as a well-defined subset of the current system activities?

if the current client population doubles, then what is the expected system response time?

The answers to such questions and/or other capacity planning information may be determined by capacity planning analyzer 501 and output as capacity planning analysis 504. Thus, the determined resource costs 105 may be used to perform further analysis, such as for analyzing the capacity of the computing system under analysis by capacity planning analyzer 501, such as described further in co-pending and commonly assigned U.S. patent application Ser. No. 11/684,569 titled "SYSTEM AND METHOD FOR CAPACITY PLANNING FOR COMPUTING SYSTEMS", the disclosure of which is incorporated herein by reference.

When implemented via computer-executable instructions, various elements of embodiments of the present invention are in essence the software code defining the operations of such various elements. The executable instructions or software code may be obtained from a readable medium (e.g., a hard drive media, optical media, EPROM, EEPROM, tape media, cartridge media, flash memory, ROM, memory stick, and/or the like) or communicated via a data signal from a communication medium (e.g., the Internet). In fact, readable media can include any medium that can store or transfer information.

Figure 6:
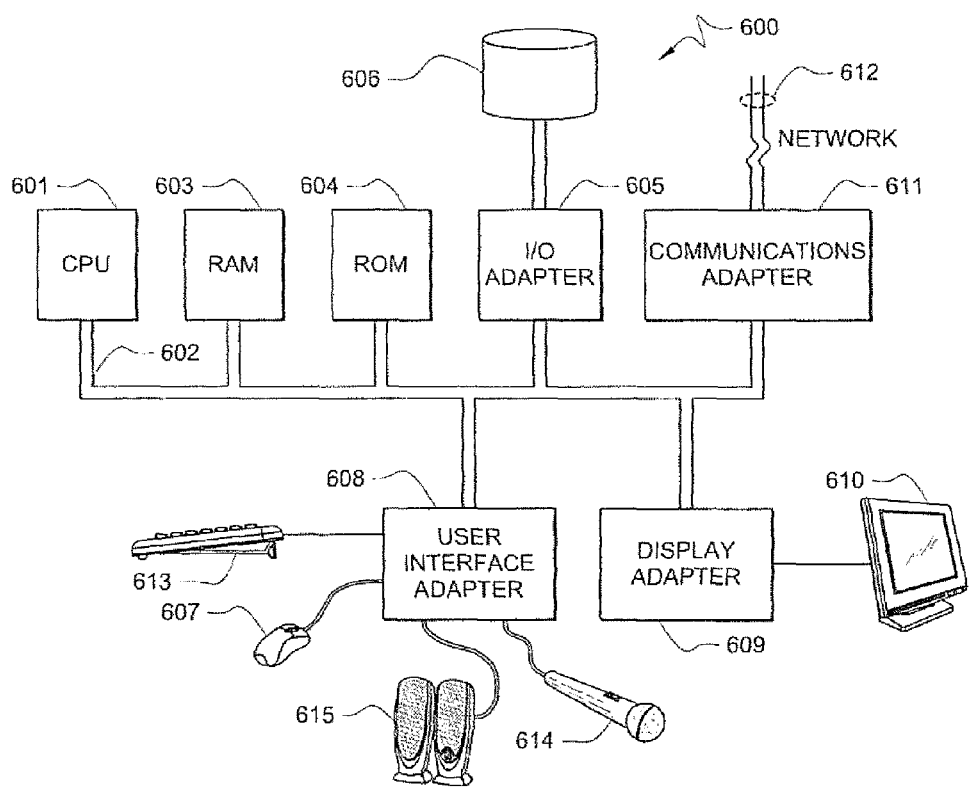
FIG. 6 shows an exemplary system on which a resource cost calculator may be implemented according to one embodiment of the present invention.

FIG. 6 illustrates an exemplary computer system 600 on which the CTRCC 103 (and/or capacity planning tool 106) may be implemented according to one embodiment of the present invention. Central processing unit (CPU) 601 is coupled to system bus 602. CPU 601 may be any general-purpose CPU. The present invention is not restricted by the architecture of CPU 601 (or other components of exemplary system 600) as long as CPU 601 (and other components of system 600) supports the inventive operations as described herein. CPU 601 may execute the various logical instructions according to embodiments of the present invention. For example, CPU 601 may execute machine-level instructions according to the exemplary operational flows described above in conjunction with FIGS. 3 and 4.

Computer system 600 also preferably includes random access memory (RAM) 603, which may be SRAM, DRAM, SDRAM, or the like. Computer system 600 preferably includes read-only memory (ROM) 604 which may be PROM, EPROM, EEPROM, or the like. RAM 603 and ROM 604 hold user and system data and programs, as is well known in the art.

Computer system 600 also preferably includes input output (I/O) adapter 605, communications adapter 611, user interface adapter 608, and display adapter 609. I/O adapter 605, user interface adapter 608, and/or communications adapter 611 may, in certain embodiments, enable a user to interact with computer system 600 in order to input information, such as QoS desires 502 and/or planning parameters 503 of a service provider.

I/O adapter 605 preferably connects to storage device(s) 606, such as one or more of hard drive, compact disc (CD) drive, floppy disk drive, tape drive, etc. to computer system 600. The storage devices may be utilized when RAM 603 is insufficient for the memory requirements associated with storing data for operations of the CTRCC 103 (e.g., representative workload 101 and/or values of the variables computed according the exemplary embodiment described in connection with FIG. 4). Communications adapter 611 is preferably adapted to couple computer system 600 to network 612, which may enable information to be input to and/or output from system 600 via such network 612 (e.g., the Internet or other wide-area network, a local-area network, a public or private switched telephony network, a wireless network, any combination of the foregoing). For instance, a representative workload 101 may be input to system 600 via network 612 from a remote computer (e.g., from the computing system under analysis), and/or a determined resource cost 105 may be output and communicated via network 612 to a remote computer. User interface adapter 608 couples user input devices, such as keyboard 613, pointing device 607, and microphone 614 and/or output devices, such as speaker(s) 615 to computer system 600. Display adapter 609 is driven by CPU 601 to control the display on display device 610 to, for example, display information regarding the determined resource cost 105 and/or capacity planning analysis 504 according to certain embodiments of the present invention.

It shall be appreciated that the present invention is not limited to the architecture of system 600. For example, any suitable processor-based device may be utilized for implementing CTRCC 103, including without limitation personal computers, laptop computers, computer workstations, and multi-processor servers. Moreover, embodiments of the present invention may be implemented on application specific integrated circuits (ASICs) or very large scale integrated (VLSI) circuits. In fact, persons of ordinary skill in the art may utilize any number of suitable structures capable of executing logical operations according to the embodiments of the present invention.

What is claimed is:

1. A method comprising:
receiving a representative workload of a computing system, said representative workload comprising at least one composite transaction;
determining a resource cost for the at least one composite transaction, said resource cost reflecting an amount of utilization of at least one resource of the computing system in serving the at least one composite transaction, the amount of utilization determined by $$U'_{CPU,n} = \frac{C_{0,n} + \sum_i N_i \cdot C_{i,n}}{T};$$

wherein T is a length of a monitoring window during which transactions served by the computing system are monitored; $U'_{CPU,n}$ is an approximation of the average CPU utilization of the computing system during the monitoring window at the n-th tier of an application hosted by the computing system, wherein n comprises at least one tier; $N_i$ is a number of composite transactions of an i-th type of composite transactions, where $1 \leq i \leq M$; and $C_{i,n}$ denotes an approximated average service time of said composite transactions of the i-th type at the n-th tier.

2. The method of claim 1 wherein said receiving comprises:
receiving said representative workload by resource cost calculation logic.

3. The method of claim 2 wherein said determining comprises:
determining said resource cost by said resource cost calculation logic.

4. The method of claim 3 wherein said resource cost calculation logic comprises computer-executable software code stored to a computer-readable medium.

5. The method of claim 1 wherein said representative workload comprises data reflecting a historical workload of said computing system.

6. The method of claim 1 wherein said at least one resource comprises at least one processor resource.

7. The method of claim 6 wherein said at least one processor resource comprises at least one central processing unit (CPU) of said computing system.

8. The method of claim 1 further comprising:
determining a plurality of different types of composite transactions, wherein said determining said resource cost comprises determining said resource cost for each of said plurality of different types of composite transactions.

9. The method of claim 1 wherein said at least one composite transaction comprises at least one composite transaction conducted with at least one application hosted by said computing system.

10. The method of claim 9 wherein said at least one application comprises a multi-tier application, and wherein said determining said resource cost comprises:
determining said resource cost for at least one tier of said multi-tier application.

11. A system comprising:
a regression-based solver operable to receive a representative workload of a computing system, said representative workload comprising at least one composite transaction; and
said regression-based solver further operable to determine a resource cost for the at least one composite transaction, said resource cost reflecting an amount of utilization of at least one resource of the computing system in serving the at least one composite transaction, the amount of utilization determined by $$U'_{CPU,n} = \frac{C_{0,n} + \sum_i N_i \cdot C_{i,n}}{T};$$

wherein T is a length of a monitoring window during which transactions served by the computing system are monitored; $U'_{CPU,n}$ is an approximation of the average CPU utilization of the computing system during the monitoring window at the n-th tier of an application hosted by the computing system, wherein n comprises at least one tier; $N_i$ is a number of composite transactions of an i-th type of composite transactions, where $1 \leq i \leq M$; and $C_{i,n}$ denotes an approximated average service time of said composite transactions of the i-th type at the n-th tier.

12. The system of claim 11 wherein said representative workload comprises data reflecting a historical workload of said computing system.

13. The system of claim 11 wherein said at least one composite transaction comprises a client access of a web page hosted by said computing system.

14. The system of claim 11 wherein said at least one resource comprises at least one processor resource of said computing system.

15. The system of claim 11 wherein said at least one composite transaction comprises at least one composite transaction conducted with at least one multi-tier application hosted by said computing system, and wherein said regression-based solver is operable to determine said resource cost for at least one tier of said multi-tier application.

16. Computer-executable software code stored to computer-readable medium, said computer-executable software code comprising:
code for receiving data representative of a workload of a computing system, said representative workload comprising at least one composite transaction; and
code for determining a resource cost for the at least one composite transaction, said resource cost reflecting an amount of utilization of at least one resource of the computing system in serving the at least one composite transaction, the amount of utilization determined by $$U'_{CPU,n} = \frac{C_{0,n} + \sum_i N_i \cdot C_{i,n}}{T};$$

wherein T is a length of a monitoring window during which transactions served by the computing system are monitored; $U'_{CPU,n}$ is an approximation of the average CPU utilization of the computing system during the monitoring window at the n-th tier of an application hosted by the computing system, wherein n comprises at least one tier; $N_i$ is a number of composite transactions of an i-th type of composite transactions, where $1 \leq i \leq M$; and $C_{i,n}$ denotes an approximated average service time of said composite transactions of the i-th type at the n-th tier.

17. The computer-executable software code of claim 16 wherein said at least one composite transaction comprises a client access of a web page hosted by said computing system, and wherein said at least one resource comprises at least one processor resource of said computing system.

* * * * *

UNITED STATES PATENT AND TRADEMARK OFFICE
CERTIFICATE OF CORRECTION

| | |
|---|---|
| PATENT NO. | : 8,032,585 B2 |
| APPLICATION NO. | : 11/684563 |
| DATED | : October 4, 2011 |
| INVENTOR(S) | : Ludmila Cherkasova et al. |

It is certified that error appears in the above-identified patent and that said Letters Patent is hereby corrected as shown below:

In the Claims:

In column 15, line 22, in Claim 11, delete "system." and insert -- system, --, therefor.

Signed and Sealed this
Eleventh Day of June, 2013

Teresa Stanek Rea
*Acting Director of the United States Patent and Trademark Office*